Feb. 6, 1973  J. V. WALKER  3,715,113
PISTON RING EXPANDER
Filed Sept. 28, 1970
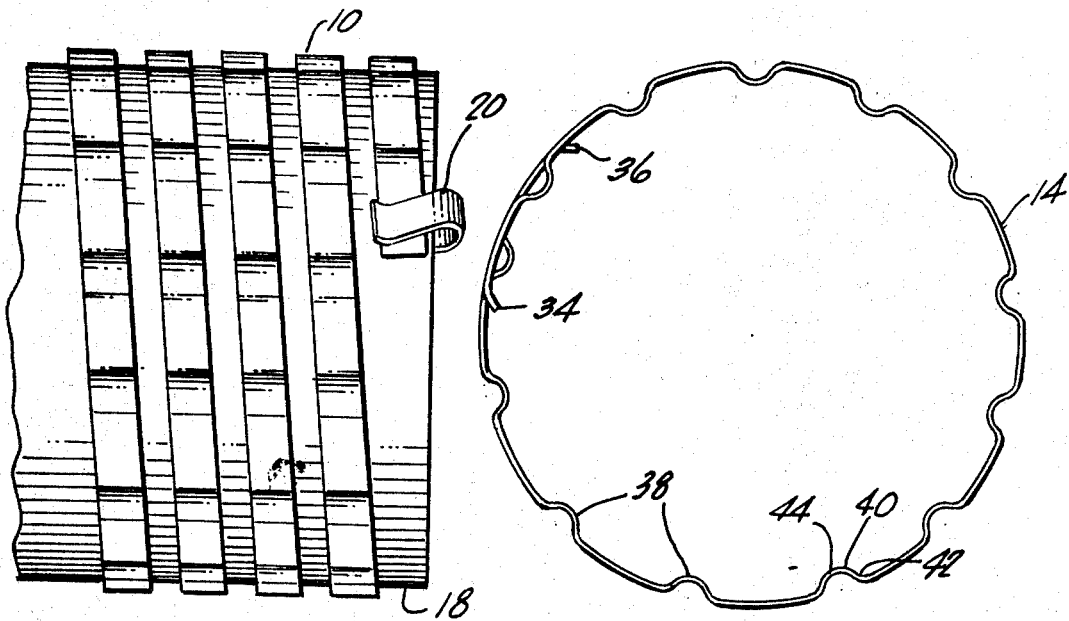
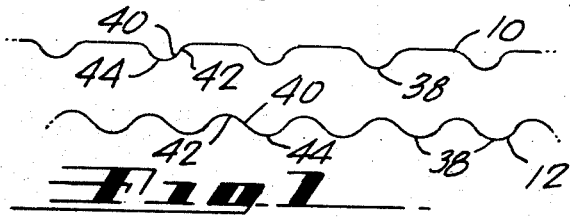
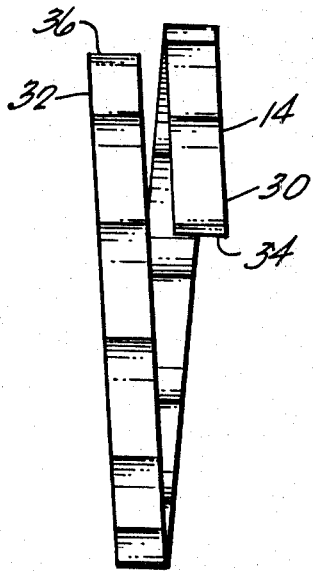
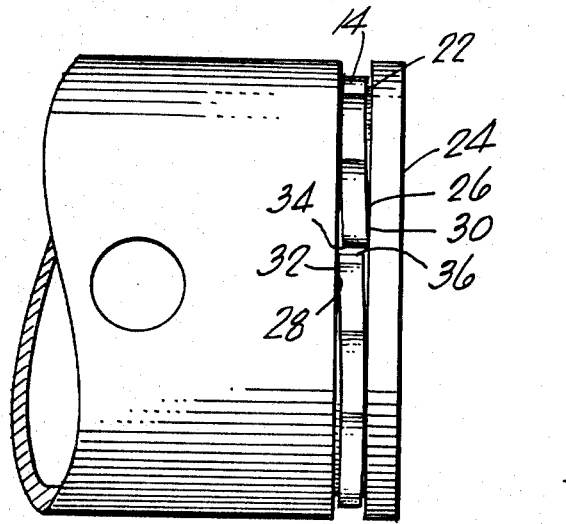
INVENTOR.
JAMES V. WALKER
BY
George D. Finch
-ATTORNEY- 3,715,113
PISTON RING EXPANDER
James V. Walker, Redondo Beach, Calif., assignor to McDonnell Douglas Corporation
Filed Sept. 28, 1970, Ser. No. 76,134
Int. Cl. F16f 1/34
U.S. Cl. 267—1.5          5 Claims

ABSTRACT OF THE DISCLOSURE

A helical piston ring expander for use with plastic or plastic-like piston rings is constructed by crimping a strip of metal, spirally winding the crimped strip around a cylindrical mandrel into a helix, heat treating the resultant assembly and cutting portions therefrom at predetermined points therealong to form the desired expander.

BACKGROUND OF THE INVENTION

Many piston ring expanders are in existence for use especially with piston rings such as plastic piston rings since such plastic rings usually do not have enough resiliency to provide proper seals by themselves. The piston ring expander is placed in the piston ring groove of the piston before the piston ring is placed therein. Thereafter the expander biases the ring outwardly against the cylinder wall to form the proper seal. The ring expanders heretofore known have been made from crimped strips of springy metal in a straight or circular configuration. The straight configuration has been unsatisfactory because when it is placed in the piston ring groove, some means must be employed to retain it there until the piston ring is inserted therearound. It is also possible to install a straight expander backwards. This has caused assembly problems. The circular configuration expanders are more easily inserted in the piston ring groove but they are expensive to make because for all intents and purposes they must be made one at a time.

SUMMARY OF THE INVENTION

The present piston ring expander is constructed by crimping a piece of strip metal by any suitable means such as those shown in G. C. Beck, U.S. Pat. No. 1,741,905. The crimped strip is then wound spirally on a cylindrically shaped mandrel whose diameter is usually less than the inner diameter of the piston ring groove in which the expander is ultimately to be used. The mandrel with its spiral crimped strip is then heat treated so that the strip takes a permanent set of a diameter closely approximating the diameter of the mandrel. The spiral crimped strip is then removed from the mandrel and cut to the desired length. The helical piston ring expanders which result can be manufactured much more cheaply than circular ring expanders since the present expanders become separate pieces only when finally formed into expanders. The helical expanders are also easier to install than straight expanders since, due to their circular set, they tend to remain in the piston ring groove. The present ring expander is for use in expanding piston rings, such as those shown in applicant's copending application entitled Split-Piston Ring and Method of Manufacture, S.N. 27,961 filed April 13, 1970, now Patent No. 3,655,208, which can tolerate a helical expander. The helical configuration of the present expander simplifies installation thereof and also allows unique manufacturing techniques to be used to produce it.

It is therefore an object of the present invention to provide a piston ring expander which can be manufactured relatively economically.

Another object is to provide a piston ring expander which can be installed in a piston ring groove only in the correct manner.

Another object is to provide a method of manufacturing a unique piston ring expander.

Another object is to provide piston ring expanders which are adaptable to manufacture in high speed automated type equipment.

These and other objects and advantages of the invention will become apparent after considering the following detailed specification which covers particular embodiments thereof in conjunction with the accompanying drawing.

BRIEF DESCRIPTION OF THE DRAWING

FIG. 1 is a side view of straight metal strips after they have been crimped.

FIG. 2 is an elevational view showing the strip of FIG. 1 spirally wrapped and attached to a cylindrical mandrel.

FIG. 3 is an elevational view of a helical piston ring expander cut from the spiral strip of FIG. 2.

FIG. 4 is a side view of the piston ring expander of FIG. 3; and

FIG. 5 is a reduced elevational view of the piston ring expander of FIGS. 3 and 4 installed in a piston ring groove.

DESCRIPTION OF THE SHOWN EMBODIMENTS

Referring to the drawing more particularly by reference numbers, number 10 in FIG. 1 refers to a metal strip crimped in a marcelled fashion, whereas 12 refers to a similar strip crimped in a serpentine fashion. Metal strips 10 and 12 such as shown in FIG. 1 are commonly used as piston ring expanders whereas in the present invention they are merely a preliminary step in the manufacture of the present piston ring expander 14. An elongated strip such as strip 10 is spirally wrapped around a cylindrical mandrel 18 having a predetermined diameter. The crimped strip 10 is fastened to the mandrel at the ends thereof by any convenient means such as the clip 20 shown in FIG. 2. The pitch of the spiral is exaggerated for clarity. The crimped strip 10 is then heat treated while being maintained in position about the mandrel 18. The heat treating of the strip 10 causes it to retain a permanent helical set at the diameter approximating the diameter of the mandrel 18. The heat treating also causes the strip 10 to become relatively springy and resilient.

After the heat treating process, the now helical strip 10 is removed from the mandrel 18 and cut to the desired lengths to form the helical piston ring expanders 14. The diameter of the mandrel 18 is usually chosen to be smaller than the inner diameter of the piston ring groove 22 in the piston 24 in which the ring expander 14 is to be used. Therefore, as shown in FIG. 3, the expander 14 in its free or unstressed condition is usually longer than one complete 360° spiral. This means that the ring expander 14 must be unwound slightly to be installed in the groove 22 and thereafter the ring expander 14, because of the permanent helical set established in the heat treating process, tends to remain in the groove 22. As shown in FIG. 5 the side edges 26 and 28 of the groove 22 abut the opposite side edges 30 and 32 of the ring expander 14 so that the amount of spiral pitch of the expander 14 is reduced when installed in the piston ring groove 22 to the clearance between the groove edges 26 and 28 and the width of the expander 14. As can be seen in FIG. 5 the expander 14 when in place in the groove 22 is unwound or stressed to the extent that its end portions 34 and 36 no longer overhang each other and therefore the expander 14 circumvents an arc of less than 360°.

The end portions 34 and 36 of the expander 14 are also cut in a predetermined manner. When crimping the strip 10 or 12 originally, the distance between adjacent crimps 38 is held to a predetermined distance so that the desired length expander 14 can be constructed by cutting the strip 10 or 12 after heat treatment at inwardly facing inflection points 40 between the opposite curved portions 42 and 44 of the crimps 38. As a result of the curvature of the piston ring expander 14 it is impossible to install the expander 14 backwards in a piston groove so that the ends 34 and 36 point outwardly in such a manner that they could gouge the piston ring which is normally installed thereabout. Gouging between the piston ring expander ends 34 and 36 and the piston ring which it expands, interferes with the flexing action of the expander 14 during operation of the piston 24 causing the expander 14 to break in some cases.

Thus there has been shown and described novel piston ring expanders and methods for manufacturing the same which fulfill all of the objects and advantages sought therefor. Many changes, modifications, variations and other uses and applications of the subject piston ring expanders and methods will, however, become apparent to those skilled in the art after considering the specification and the accompanying drawing. All such changes, modifications, alterations and other uses and application which do not depart from the spirit and scope of the invention are deemed to be covered by the invention which is limited only by the claims which follow.

What is claimed is:

1. A piston ring expander having:
    a central body portion formed of a helical strip of uniform width having indentations toward the center of the helix spaced therealong, said central body portion subtending an arc of more than 360° when said expander is in an unstressed state; and
    end portions on the opposite ends of the central body portion, said end portions being positioned in said indentations so that the ends of said expander face inwardly toward the center of said helix.

2. The piston ring expander defined in claim 1 wherein each of said indentations include two outer curved portions and a central curved portion therebetween, said central curved portion being curved in an opposite direction but with generally the same radius of curvature as said outer curved portions so that inflection points are formed between said outer curved portions and said central curved portion, each of said expander ends being at an inflection point of an indentation.

3. The piston ring expander defined in claim 1 wherein said helical strip is constructed from resilient steel.

4. A piston ring expander constructed by:
    crimping indentations into an elongate strip of steel;
    wrapping said crimped elongate strip of steel in a helix about a mandrel;
    heat treating said wrapped crimped elongate strip so that it becomes resilient and set in a helical coil;
    removing said helical coil from said mandrel; and
    cutting a predetermined length from said helical coil to form said piston ring expander.

5. The piston ring expander defined in claim 4 wherein:
    said elongate strip of steel has a generally constant width and thickness.

References Cited

UNITED STATES PATENTS

| | | | |
|---|---|---|---|
| 2,249,256 | 7/1941 | Phillips | 267—1.5 |
| 2,785,027 | 3/1957 | Hamm | 267—1.5 |
| 3,000,677 | 9/1961 | Thomas et al. | 267—1.5 |

JAMES B. MARBERT, Primary Examiner